United States Patent [19]

Wilson

[11] 4,437,338

[45] Mar. 20, 1984

[54] SPARK PLUG MICROWAVE ADAPTER

[75] Inventor: Scott E. Wilson, Ann Arbor, Mich.

[73] Assignee: Jodon Engineering Associates, Inc., Ann Arbor, Mich.

[21] Appl. No.: 301,205

[22] Filed: Sep. 11, 1981
(Under 37 CFR 1.47)

Related U.S. Application Data

[63] Continuation-in-part of Ser. No. 192,728, Oct. 1, 1980, abandoned.

[51] Int. Cl.³ .......................................... G01M 15/00
[52] U.S. Cl. ................... 73/116; 324/58.5 B; 333/24 R
[58] Field of Search ............... 73/116; 333/12, 24 R, 333/99 R, 252, 248; 324/58.5 C, 58 R, 58 B, 58 C, 58.5 R, 58.5 B; 123/169 R, 143 R, 536; 361/253

[56] References Cited

U.S. PATENT DOCUMENTS 2,761,061  8/1956  Mattern .................... 333/137 X
3,589,177  6/1971  Merlo ........................... 73/116
3,703,825 11/1972  Merlo ........................... 73/116

Primary Examiner—Jerry W. Myracle
Attorney, Agent, or Firm—Barnes, Kisselle, Raisch, Choate, Whittemore & Hulbert

[57] ABSTRACT

An adapter for coupling microwave energy or both microwave and spark energy into the combustion chamber of a gasoline engine through the chamber spark plug comprising a sleeve adapted at one end to be tightly received over the spark plug insulator housing, and a connector carried at the opposing sleeve end and adapted for connection to a spark plug lead for transmitting spark energy to the spark plug electrodes. A microwave antenna is carried externally of the sleeve for transmitting microwave energy in a waveguide mode through the sleeve and through the insulator housing into the engine chamber while substantially bypassing the spark energy conduction path. The antenna, which may comprise a square loop antenna disposed in a plane parallel to the sleeve and spark plug axes, is adapted to be coupled to a source of microwave energy for monitoring of engine ignition events, etc.

14 Claims, 5 Drawing Figures

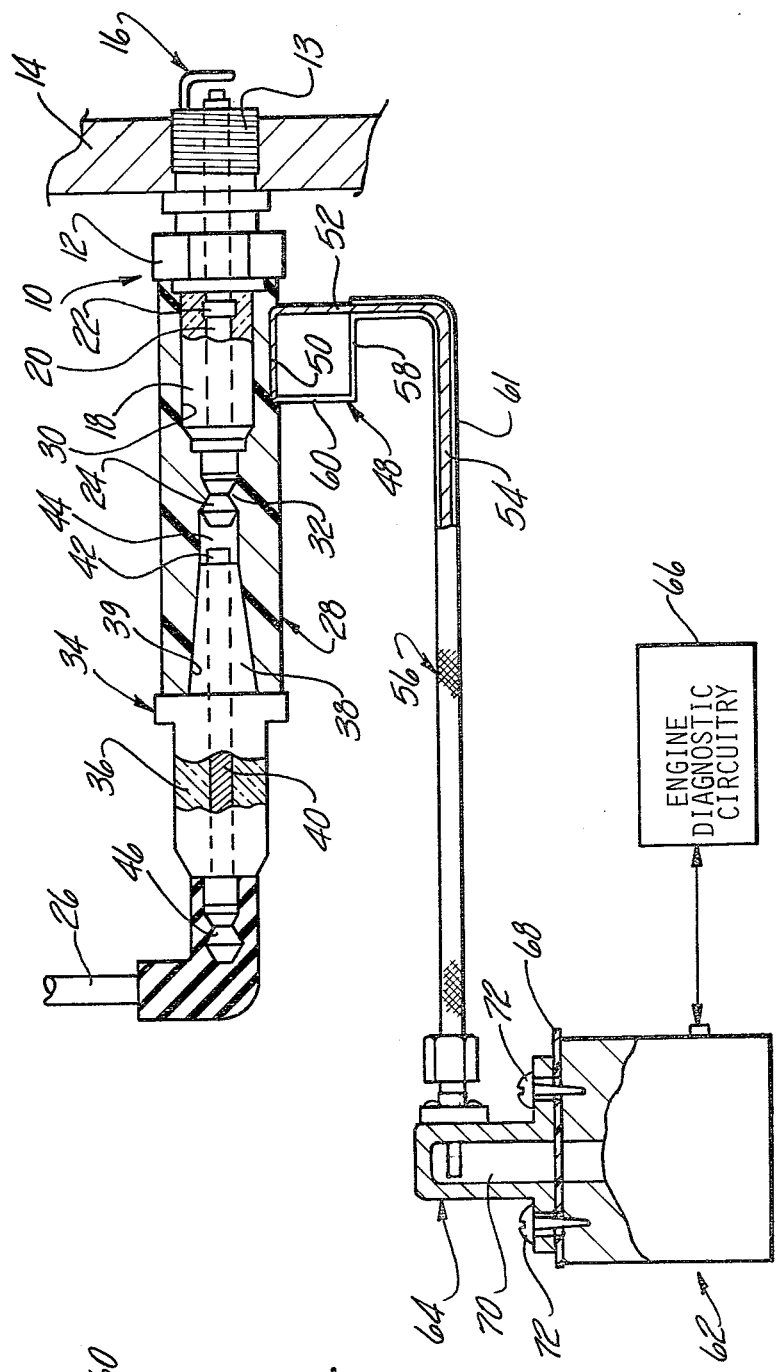
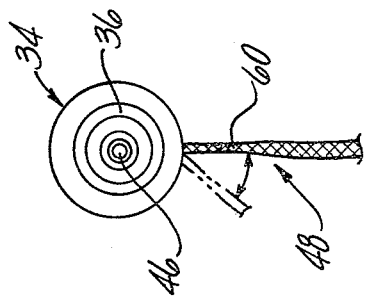

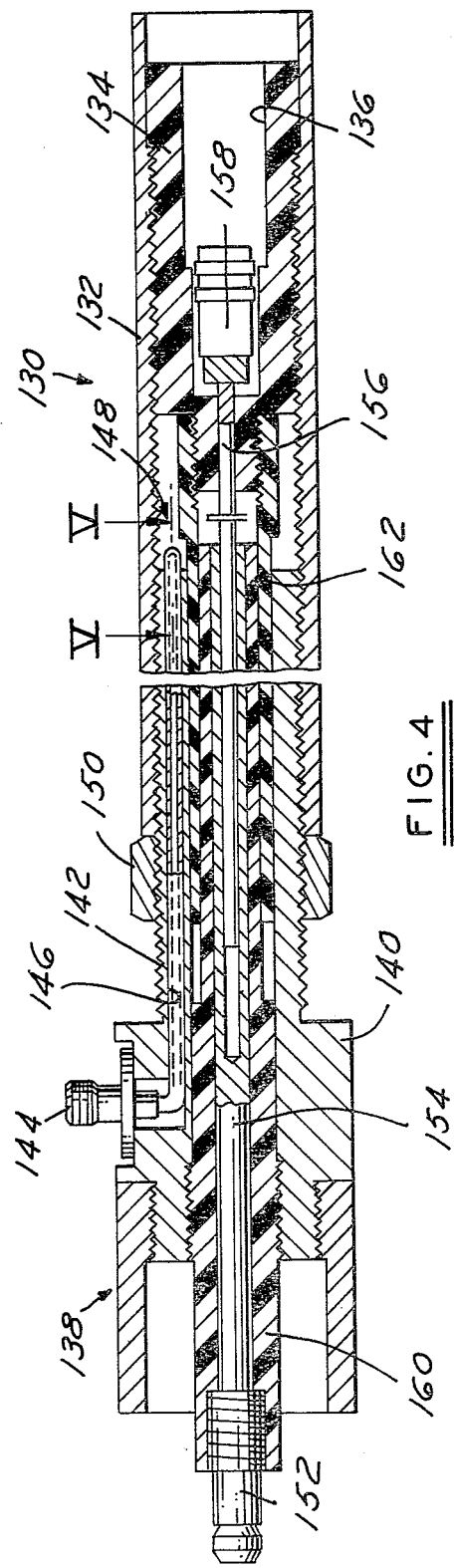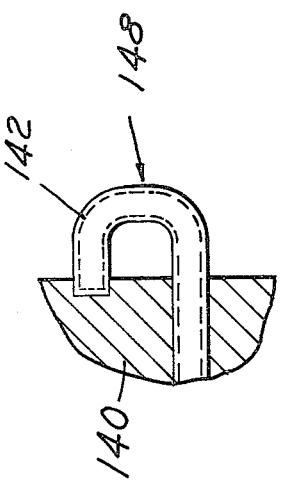

SPARK PLUG MICROWAVE ADAPTER

This application is a continuation-in-part of U.S. application Ser. No. 192,728 filed Oct. 1, 1980 and now abandoned.

BACKGROUND AND FIELD OF INVENTION

The present invention relates to engine diagnostics, and more particularly to apparatus for monitoring events in the combination chamber of an internal combustion engine by means of microwave energy injected into the chamber. Yet more specifically, the invention relates to an adapter for coupling both microwave and spark energy into the combustion chamber of a gasoline engine through an engine spark plug.

It has heretofore been proposed to inject microwave energy into the combustion chamber of a gasoline engine, and to monitor the microwave signal for identifying and diagnosing engine timing events, etc. The U.S. patents to Merlo U.S. Pat. Nos. 3,589,177 and 3,703,825 disclose an adapter for coupling both microwave and spark energy into the combustion chamber of a gasoline engine through an engine spark plug. The Merlo adapter includes a waveguide and a coaxial transmission line extending transversely through the waveguide to the spark plug in a generally T-shaped configuration. Spark energy is transmitted to the spark plug by the center conductor of the coax transmission portion of the adapter which extends transversely through the waveguide and is surrounded by an insulator. Microwave energy transmitted through the waveguide is coupled to the center conductor through the dielectric, and thereby to the combustion chamber through the spark plug conduction path and spark electrodes.

Spark plugs which have come into conventional and widespread use in recent years include a section of high resistance material (believed to be refractory material) or the like electrically separating the spark plug input terminal from the spark electrodes so as to inhibit passage of rf noise, etc. in the reverse direction from the electrodes to the spark plug leads. A significant disadvantage of the Merlo spark plug adapter previously described lies in the fact that it can operate only at greately reduced efficiency with such conventional spark plugs due to the fact that the Merlo adapter relies upon transmission of the microwave energy in the so-called coaxial TEM transmission mode through a spark plug conduction path from the input terminal to the electrodes. An important object of the present invention is to provide an adapter for coupling microwave energy into an engine combustion chamber through a spark plug which does not rely upon the spark plug terminal and conduction path, and which thereby avoids problems associated with the section of high resistance material in conventional spark plugs previously described.

BRIEF DESCRIPTION OF THE DRAWINGS

The invention, together with additional objects, features and advantages thereof, will be best understood from the following description, the appended claims and the accompanying drawings in which:

FIG. 1 is a fragmentary partially sectioned and partially schematic view of the spark plug adapter in accordance with the present invention;

FIG. 2 is an elevational end view of the adapter illustrated in FIG. 1 with spark plug lead removed;

FIGS. 3 and 4 are sectional views of respective modified spark plug adapters which embody the principles of the invention; and FIG. 5 is a fragmented sectional view taken along the line 5—5 in FIG. 4.

DETAILED DESCRIPTION OF THE PREFERRED EMBODIMENTS

Figure 3:
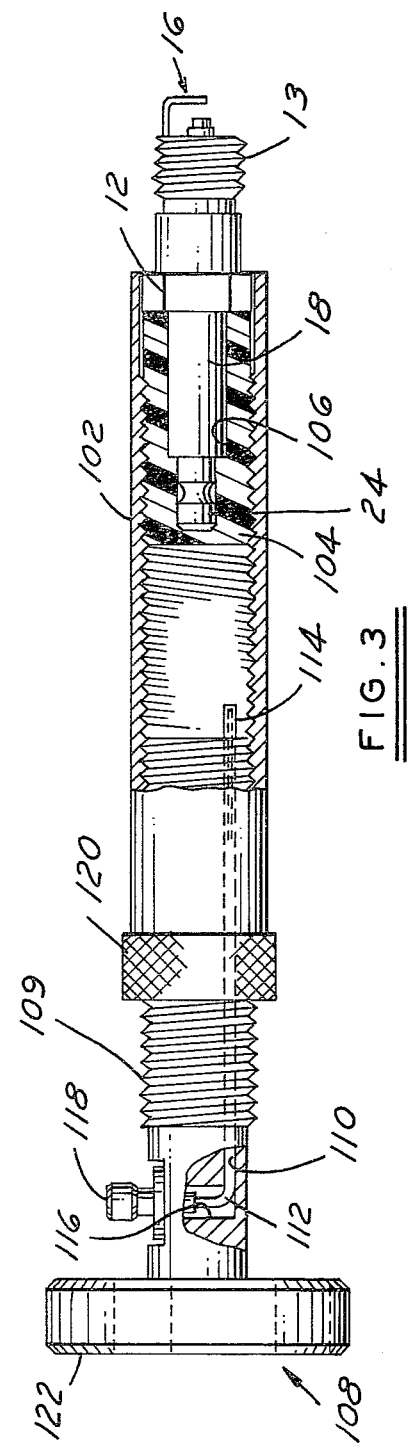

Referring to FIG. 1, a conventional spark plug 10 includes a metal shell 12 adapted at one end 13 to be threaded into an opening in an engine block 14 within the engine combustion chamber. A ceramic insulator housing 18 is carried by shell 12 and encompasses a sectioned spark plug electrode conductor 20. A section 22 of high resistance material such as a refractory metal is disposed in series with sections of electrode conductor 20 so as to suppress rf emissions as previously described. A spark plug input terminal 24 projects axially from insulator housing 18 and is adapted to be connected to a spark plug lead 26 from a distributor or the like (not shown) for feeding spark energy to spark electrodes 16.

The spark plug adapter in accordance with the present invention as illustrated in FIGS. 1 and 2 comprises a cylindrical sleeve 28 having an opening 30 at one end adapted to be received over spark plug insulator housing 18 with spark plug lead 26 removed therefrom. Most preferably, opening 30 is internally contoured to complement the contour of the spark plug insulator housing and terminal 24, and is snugly received over the insulator housing to promote transmission of microwave energy from the sleeve to the housing. An annular lip 32 within opening 30 is adapted to be received by snap fit into a corresponding recess on the spark plug terminal so that sleeve 28 is firmly mounted on the spark plug. Preferably, sleeve 28 is constructed of TEFLON or other resiliently flexible insulating material. A connector 34 is mounted on an end of sleeve 28 remote from opening 30, and includes an insulator body 36 of ceramic or the like having a tapering neck 38 extending into and adhered within a corresponding opening 39 in sleeve 28. An electrical conductor 40 extends through insulator body 36 and terminates at 42 within sleeve 28 at a position adapted when sleeve 28 is received over a spark plug of conventional size to be separated or spaced axially from plug terminal 24 by an air gap 44. Externally of insulator body 36, conductor 40 terminates in a terminal 46 adapted to removably receive the spark plug cable 26 so that spark energy will be transmitted from cable 26 through conductor 40 across air gap 44 and then through spark plug 10 to the combustion chamber.

A microwave antenna 48 is mounted externally of sleeve 28 near the open end thereof that is adapted to be telescoped over spark plug 10, so that the antenna is positioned in assembly with a spark plug radially adjacent spark plug insulator housing 18. Preferably, antenna 48 comprises a square loop antenna consisting on two adjacent sides 50, 52 of the center conductor 54 of a section of coax cable 56, and on the opposing adjacent sides 58, 60 of the cable ground conductor or shield 61, the center conductor and shield being electrically connected at the free ends of loop sides 50, 60. Loop antenna 48 is affixed to sleeve 28 by having one side 50 mounted to or embedded in the outer sleeve surface in an orientation parallel to the axis of sleeve 28, and thus parallel to the axis of spark plug 10, so that loop 48 is effectively disposed in a plane parallel to the sleeve and spark plug axes. Remotely of antenna 48, coax cable 56 is coupled through a coax adapter 64 such as a Hewlett Packard coax adapter Model X281A to a microwave transceiver 62 such as a Microwave Associates "Gunnplexer" Model MA-87141-1. Adapter 64 is insulated from transceiver 62 by a sheet 68 of insulating material such as cellophane. Sheet 68 extends across waveguide cavity 70 in adapter 64 and transceiver 62 for blocking the d.c. high energy signal induced in loop 48 by the spark signal to plug 10. Adapter 64 is mounted to transceiver 62 by insulating screws 72 of nylon, for example. The input and output terminals of transceiver 62, which includes microwave source and detection means, are coupled to engine diagnostic circuitry 66, one example of which is shown in the above-referenced Merlo patents.

In operation, microwave energy is injected into the engine combustion chamber from antenna 48 through sleeve 28 and spark plug insulator housing 18, thereby effectively avoiding the high resistance presented by spark plug section 22. Stated differently, and in accordance with a critical and distinguishing feature of the present invention in its broadest aspects, insulation sleeve 28 and spark plug insulation housing 18 cooperate for direct transmission or coupling of microwave energy into the engine cylinder avoiding or substantially avoiding the spark plug conduction path and spark electrodes. That is to say that the spark plug conduction path plays no substantial role in transmission of microwave energy into the engine cylinder. Thus, the adapter of the invention functions in the so-called waveguide transmission mode, as distinguished from the so-called coaxial TEM transmission mode characteristic of the above-noted Merlo prior art, and thereby avoids the consequent difficulties encountered with the prior art and discussed hereinabove.

Transmission of microwave energy to spark plug lead 26 is effectively inhibited by air gap 44. In one working embodiment of the invention wherein the microwave frequency is ten gigahertz, gap 44 may range in axial dimension between 0.025 and 0.250 inch, and preferably is on the order of substantially 0.050 inch. The circumferential dimension of loop antenna 48 is preferably equal to one wavelength of the selected microwave frequency, although it is not known at this time whether such circumferential dimension is critical to operation of the embodiment of FIGS. 1 and 2. Nominally, loop 48 is coplanar with the coincident axes of sleeve 28 and spark plug 10, as best seen in FIG. 2. A particular advantage of the square loop configuration in accordance with FIGS. 1 and 2 lies in the fact that the plane of such loop may be manually adjusted angularly with respect to the sleeve and spark plug axes, as shown in phantom in FIG. 2, empirically to obtain optimum coupling of microwave energy into the combustion chamber.

The embodiment of the invention heretofore described is particularly useful for after-market microwave analysis of engine operation in a service environment with the engine already mounted in an automobile. In such an environment, the spark plug lead for a selected cylinder may be removed from the spark plug and the adapter sleeve 28 telescoped over the selected spark plug as previously described. Resiliency of sleeve 28 facilitates mounting and removal of the adapter. With lead 26 then coupled to adapter terminal 46, the engine may be operated without noticeable effect attributable to the microwave diagnostic equipment and adapter. Under some circumstances the adapter may be equipped with its own spark plug received in sleeve 28, so that in a test environment the engine spark plug is removed and replaced by the adapter with test spark plug. It may also be possible under some circumstances to eliminate adapter connector 34 and to provide a shortened sleeve 28 of sufficient length for mounting antenna 48 over spark plug insulator housing 18. For such a modification, spark plug lead 26 may be connected directly to spark plug terminal 24.

FIGS. 3-5 illustrate modified spark plug adapters which embody the principles of the invention. The adapter 100 of FIG. 3 is a so-called cold adapter for use where spark energy is not to be supplied to the cylinder under test. Adapter 100 includes a hollow internally threaded metal tube 102 having a plug 104 of insulating material threadably received in one end. Plug 104 has an internal cavity 106 contoured snugly to receive at least the insulator housing 18 of the spark plug 10. A microwave tuning assembly 108 comprises a metal core 109 threadably received in an opposing end of tube 102 and having a passage 110 extending longitudinally therethrough parallel to but laterally offset from the axis of core 109 and tube 102. An insulated conductor 112 is received in passage 110 and projects from core 109 internally of tube 102 in the air space or cavity between core 109 and plug 104 to form a linear microwave antenna 114. Conductor 112 is connected internally of core 109 through a lateral passage 116 to a coaxial connector 118 for receiving microwave energy from a source as in FIG. 1. A knurled jam nut 120 is threaded onto core 109, and a handle 122 is formed integrally with the core.

The second modified adapter 130 shown in FIGS. 4 and 5 is adapted for so-called hot operation where spark energy is to be applied to the spark plug during test, as in the embodiment of FIGS. 1 and 2 previously discussed. In adapter 130, a hollow sleeve or plug 132 of insulating material is threadedly received into one end of a metal tube 134 and internally contoured at 136 snugly to receive a spark plug insulator housing as previously described. A tuning assembly 138 includes a metal core 140 threaded into tube 132. An insulated conductor 142 extends from a coax connector 144 through a passage 146 in core 140 to terminate in a three-sided open loop antenna 148 of generally square contour in the air cavity within tube 132 between core 140 and plug 134. The plane of antenna 148 is tangential to the axis of adapter 130. A jam nut 150 is threaded into core 140. Spark energy is fed from a terminal 152 on core 140 adapted for connection to a spark plug wire (FIG. 1) through sliding telescoped brass conductors 154, 156 to a cap 158 adapted to be received over a spark plug terminal. Conductor 154 is carried within core 140 by the sliding insulator elements 160, 162.

In each of the modifications of FIGS. 3-5, microwave energy is radiated in a waveguide mode from the antenna (114 in FIG. 3, 148 in FIGS. 4 and 5) through an air space and through a plug of insulating material (104 in FIG. 3, 134 in FIG. 4) into the spark plug insulator housing. The energy is then transmitted through the insulator housing into the cylinder under test bypassing the spark plug conductive path and electrodes. Thus, although the modifications of FIGS. 3-5 are different in detail from the embodiment of FIGS. 1 and 2, the modified embodiments embody the general principle of the invention whereby microwave energy is transmitted in the waveguide transmission mode into and through the spark plug insulator housing, and thence into the engine cylinder, while substantially bypassing the conduction path for spark energy. The details of adapters of FIGS. 3-5 are not the subject of this application.

The invention claimed is:

1. An adapter for coupling microwave energy into a combustion chamber of an internal combustion engine through a spark plug of the type which includes an insulator housing and a spark conduction path, said adapter comprising means shaped so as to be adapted to be removably and snugly received over the spark plug insulator housing, and a microwave antenna mounted on said means and adapted to be coupled to a source of microwave energy for transmitting said microwave energy through said means and through the spark plug insulator housing into the engine chamber in a waveguide transmission mode.

2. The adapter set forth in claim 1 wherein said means is constructed of a resiliently flexible insulating material and is adapted to be received and retained by a snap fit over said spark plug insulator housing and terminal.

3. The adapter set forth in claim 1 wherein said microwave antenna is mounted on said means so as to be positioned radially adjacent to the spark plug insulator housing when said means is received over the insulator housing.

4. The adapter set forth in claim 3 wherein said means is constructed of insulating material and is structured to be received and retained by snap-fit over a said spark plug insulator housing.

5. The adapter set forth in claim 4 wherein said means comprises a sleeve of insulating material constructed to be axially snugly received over a spark plug insulator housing.

6. An adapter for coupling both microwave and spark energy into the combustion chamber of an internal combustion engine through a spark plug having an insulator housing and a terminal extending axially from the housing for connection to a spark plug lead, said adapter comprising a first means including a member constructed of insulating material having a bore at one end adapted to be removably received over the spark plug insulator housing such that the spark plug terminal is positioned within said bore, second means carried by said first means spaced from said one end and including conductive means adapted removably to receive a sprak plug lead and extending into said bore so as to be electrically connected to the spark plug terminal when said member is received over the insulator housing, and microwave transmission means including an antenna carried by said first means and adapted to be connected to a source of microwave energy so as to transmit said microwave energy through said member and through said insulator housing into an engine combustion chamber in a waveguide transmission mode.

7. An adapter for coupling microwave and spark energy into the combustion chamber of a gasoline engine comprising a spark plug having an insulator housing and spark electrodes at one end, said end being adapted to be threaded into an engine so that the spark electrodes project into the combustion chamber, and an electrical terminal sleeve surrounding said insulator housing such that said electrical terminal is disposed within said sleeve; conductive means extending into said sleeve and electrically connected to said terminal, said conductive means having a second end adapted to receive a spark plug lead for establishing a conductive path for spark energy through said conductive means, and terminal and said electrodes; and a microwave antenna carried externally of said sleeve and adapted to be coupled to a source of microwave energy for transmitting microwave energy through said sleeve and through said insulator housing in a waveguide transmission mode.

8. The adapter set forth in claim 1, 6 or 7 wherein said microwave antenna comprises a loop antenna.

9. The adapter set forth in claim 8 wherein said antenna comprises a square loop antenna having one loop side mounted parallel to said axis.

10. The adapter set forth in claim 9 wherein said plane of said antenna is angularly adjustable with respect to said axis.

11. The adapter set forth in claim 9 for coupling microwave energy at preselected wavelength into the combustion chamber wherein said square loop antenna has a loop dimension substantially equal to one said wavelength.

12. The adapter set forth in claim 6 or 7 wherein said conductive means is separated from said spark plug terminal by a high-resistance gap so as to inhibit transmission of microwave energy to said spark plug lead.

13. The adapter set forth in claim 12 wherein said gap comprises an air gap having a dimension in the range of 0.025 to 0.250 inches between said conductive means and said spark plug terminal.

14. The adapter set forth in claim 13 wherein said dimension is substantially equal to 0.050 inches.

* * * * *